United States Patent
Nagai (10) Patent No.: US 11,318,797 B2
(45) Date of Patent: May 3, 2022

(54) PNEUMATIC TIRE

(71) Applicant: TOYO TIRE & RUBBER CO., LTD., Itami (JP)

(72) Inventor: Kunihiko Nagai, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 484 days.

(21) Appl. No.: 16/215,784

(22) Filed: Dec. 11, 2018

(65) Prior Publication Data
US 2019/0193486 A1    Jun. 27, 2019

(30) Foreign Application Priority Data

Dec. 22, 2017 (JP) .............................. JP2017-245822

(51) Int. Cl.
*B60C 15/06* (2006.01)
*B60C 13/00* (2006.01)

(52) U.S. Cl.
CPC .......... *B60C 15/06* (2013.01); *B60C 15/0635* (2013.01); *B60C 2013/006* (2013.01); *B60C 2015/0614* (2013.01); *B60C 2015/0617* (2013.01); *B60C 2015/0621* (2013.01); *Y10T 152/10828* (2015.01); *Y10T 152/10837* (2015.01); *Y10T 152/10846* (2015.01)

(58) Field of Classification Search
CPC ..... Y10T 152/10828; Y10T 152/10837; Y10T 152/10846; B60C 2015/0614; B60C 2015/0617; B60C 2015/0621; B60C 2015/0625; B60C 15/0628; B60C 15/0635; B60C 15/0607; B60C 15/06
USPC ......................................... 152/543, 546, 547
See application file for complete search history.

(56) References Cited

U.S. PATENT DOCUMENTS

| 5,885,388 A | 3/1999 | Ueyoko et al. |
| 2006/0272757 A1 | 12/2006 | Mizuno |
| 2007/0151649 A1 | 7/2007 | Numata |

(Continued)

FOREIGN PATENT DOCUMENTS

| CN | 1826239 A | 8/2006 |
| CN | 1876701 A | 12/2006 |

(Continued)

OTHER PUBLICATIONS

Office Action dated Sep. 30, 2020, issued in counterpart CN Application No. 201811496834.0, with English Translation. (13 pages).

(Continued)

*Primary Examiner* — Adrienne C. Johnstone
(74) *Attorney, Agent, or Firm* — WHDA, LLP (57) ABSTRACT

A pneumatic tire includes a pair of bead cores; a pair of bead fillers; a carcass ply; a side wall rubber; a chafer layer that is rolled up on an outer surface of the carcass ply; and a pair of support rubbers that is located between the side wall rubber and the carcass ply and arranged such that a rolled-up end of the chafer layer is sandwiched from both sides in a tire width direction. The pair of support rubbers includes a tape rubber located inside in the tire width direction and a rear pad rubber located outside in the tire width direction. A modulus value of the tape rubber is higher than a modulus value of the side wall rubber. A modulus value of the rear pad rubber is higher than the modulus value of the tape rubber.

10 Claims, 3 Drawing Sheets

(56) References Cited

U.S. PATENT DOCUMENTS

| | | | |
|---|---|---|---|
| 2007/0175561 A1 | 8/2007 | Daghini et al. | |
| 2008/0035261 A1 | 2/2008 | Maruoka | |
| 2008/0093001 A1* | 4/2008 | Ono | B60C 15/06 |
| 2009/0114332 A1 | 5/2009 | Daghini et al. | |
| 2012/0073723 A1 | 3/2012 | Daval | |
| 2012/0186717 A1 | 7/2012 | Kodama | |
| 2013/0037196 A1 | 2/2013 | Kodama | |
| 2013/0133806 A1 | 5/2013 | Amano et al. | |
| 2013/0303657 A1 | 11/2013 | Miyazaki | |
| 2014/0011939 A1 | 1/2014 | Iizuka et al. | |
| 2015/0083297 A1 | 3/2015 | Inata et al. | |
| 2015/0144242 A1 | 5/2015 | Lagarde, Jr. et al. | |
| 2016/0114633 A1 | 4/2016 | Miyasaka | |
| 2017/0355830 A1 | 12/2017 | Haba et al. | |

FOREIGN PATENT DOCUMENTS

| | | |
|---|---|---|
| CN | 1990277 A | 7/2007 |
| CN | 101072693 A | 11/2007 |
| CN | 101121370 A | 2/2008 |
| CN | 102616091 A | 8/2012 |
| CN | 103476852 A | 12/2013 |
| CN | 104002618 A | 8/2014 |
| CN | 104395112 A | 3/2015 |
| CN | 104395378 A | 3/2015 |
| CN | 105539019 A | 5/2016 |
| EP | 72956 A2 | 3/1983 |
| EP | 2662405 B1 | 12/2014 |
| JP | S63-83148 A | 4/1988 |
| JP | H06-191240 A | 7/1994 |
| JP | H08-156533 A | 6/1996 |
| JP | H09-099710 A | 4/1997 |
| JP | H09-99715 A | 4/1997 |
| JP | H09-315112 A | 12/1997 |
| JP | H11-227409 A | 8/1999 |
| JP | 2000-301919 A | 10/2000 |
| JP | 2002-178724 A | 6/2002 |
| JP | 2005-112042 A | 4/2005 |
| JP | 2008-69207 A | 3/2008 |
| JP | 2009-101943 A | 5/2009 |
| JP | 2009-292310 A | 12/2009 |
| JP | 2012-025296 A | 2/2012 |
| JP | 5442762 B2 | 3/2014 |
| JP | 5944826 B2 | 7/2016 |
| JP | 2017-222764 A | 12/2017 |

OTHER PUBLICATIONS

Office Action dated Aug. 31, 2021, issued in JP Application No. 2017-245823, with English translation. (counterpart to U.S. Appl. No. 16/215,728) (8 pages).
Office Action dated Aug. 31, 2021, issued in counterpart JP Application No. 2017-245822, with English translation. (7 pages).
Office Action dated Aug. 31, 2021, issued in JP Application No. 2017-245821, with English translation. (counterpart to U.S. Appl. No. 16/215,764) (6 pages).
Non-Final Office Action dated Aug. 16, 2021, issued in U.S. Appl. No. 16/215,740. (33 pages).
Office Action dated Jan. 24, 2019, issued in counterpart DE Application No. 102018131338.1, with English translation. (counterpart to U.S. Appl. No. 16/215,863) (7 pages).
Office Action dated Jul. 30, 2020, issued in counterpart CN Application No. 20181149795.4, with English Translation. (counterpart to U.S. Appl. No. 16/215,863) (18 pages).
Office Action dated Sep. 30, 2020, issued in CN Application No. 201811497149.X, (with English Translation). (counterpart to U.S. Appl. No. 16/215,740) (17 pages).
Office Action dated Oct. 19, 2020, issued in CN Application No. 201811495881.3, with English Translation. (counterpart to U.S. Appl. No. 16/215,764) (15 pages).
Office Action dated Sep. 14, 2020, issued in CN Application No. 201811498133.0, with English translation (counterpart to U.S. Appl. No. 16/215,728) (12 pages).
Office Action dated Mar. 24, 2021, issued in counterpart CN Application No. 201811497975.4. (counterpart to U.S. Appl. No. 16/215,863)(6 pages).
Non-Final Office Action dated Apr. 6, 2021, issued in U.S. Appl. No. 16/215,764 (18 pages).
Non-Final Office Action dated Mar. 18, 2021, issued in U.S. Appl. No. 16/215,728 (19 pages).
Office Action dated Apr. 26, 2021, issued in CN Application No. 201811498133.0, with English Translation. (counterpart to U.S. Appl. No. 16/215,728)(16 pages).
Office Action dated Jun. 4, 2021, issued in CN Application No. 201811497149.X, (counterpart to U.S. Appl. No. 16/215,740)(7 pages).
English translation of Chinese Office Action dated Mar. 24, 2021, issued in counterpart CN Application No. 201811497975.4 (counterpart to U.S. Appl. No. 16/215,863).(5 pages).
English translation of Chinese Office Action dated Jun. 4, 2021, issued in CN Application No. 201811497149.X counterpart to U.S. Appl. No. 16/215,740). (7 pages).
Office Action dated Nov. 2, 2021, issued in JP application No. 2017-245827 (counterpart to U.S. Appl. No. 16/215,863), with English translation. (12 pages).
Office Action dated Nov. 2, 2021, issued in JP application No. 2017-245828 (counterpart to U.S. Appl. No. 16/215,863), with English translation. (13 pages).
Office Action dated Oct. 13, 2021, issued in CN application No. 201811497975.4 (counterpart to U.S. Appl. No. 16/215,863), with English translation. (14 pages).
Office Action dated Nov. 2, 2021, issued in JP application No. 2017-245824 (counterpart to U.S. Appl. No. 16/215,740), with English translation. (10 pages).
Office Action dated Nov. 2, 2021, issued in JP application No. 2017-245825 (counterpart to U.S. Appl. No. 16/215,740), with English translation. (13 pages).
Office Action dated Nov. 2, 2021, issued in JP application No. 2017-245826 (counterpart to U.S. Appl. No. 16/215,740), with English translation. (11 pages).
Office Action dated Nov. 3, 2021, issued in CN Application No. 201811497149.X (counterpart to U.S. Appl. No. 16/215,740), with English translation. (15 pages).
Office Action dated Feb. 8, 2022, issued in JP application No. 2017-245824 (counterpart to U.S. Appl. No. 16/215,740), with English translation. (8 pages).
Office Action dated Feb. 8, 2022, issued in JP application No. 2017-245825 (counterpart to U.S. Appl. No. 16/215,740), with English translation. (10 pages).
Office Action dated Feb. 8, 2022, issued in JP application No. 2017-245826 (counterpart to U.S. Appl. No. 16/215,740), with English translation. (14 pages).
Office Action dated Feb. 8, 2022, issued in JP application No. 2017-245827 (counterpart to U.S. Appl. No. 16/215,863), with English translation. (9 pages).
Office Action dated Feb. 8, 2022, issued in JP application No. 2017-245828 (counterpart to U.S. Appl. No. 16/215,863), with English translation. (10 pages).

* cited by examiner

PNEUMATIC TIRE

CROSS-REFERENCE TO RELATED APPLICATIONS

This application claims priority of Japanese Patent Application No.: 2017-245822 filed on Dec. 22, 2017, the content of which is incorporated herein by reference.

BACKGROUND OF THE INVENTION

Technical Field

The present invention relates to a pneumatic tire.

Related Art

There is known a pneumatic tire with a pad rubber in a bead part. For example, Japanese Patent Publication No. 5442762 and Japanese Patent Publication No. 5944826 disclose a pneumatic tire in which a pad rubber is arranged on the tire-outer-surface-side of a carcass ply so as to correspond to the outside of a bead filler in a tire width direction. The pad rubber suppresses the concentration of distortion near an outer-diameter-side end of the bead filler caused by a load input from a rim flange and/or defamation of a side wall part, etc., when rolling under a load and therefore, separation of the carcass ply rolled up thereon is suppressed.

The pad rubber according to Japanese Patent Publication No. 5442762 is arranged over the tire-inner-surface-side of a rim strip rubber and a side wall rubber adjacent to the outer-diameter-side of the rim strip rubber in a tire radial direction. The pad rubber according to Japanese Patent Publication No. 5944826 is arranged on the tire-inner-surface-side of the rim strip rubber.

SUMMARY

In the pneumatic tire according to Japanese Patent Publication No. 5944826, a chafer layer rolled up from the tire-inner-surface-side to the tire-outer-surface-side is provided around a bead part. In this case, when rolling under a load, the distortion is likely to be concentrated also on a rolled-up end of the chafer layer around the bead part. However, in the pneumatic tire according to Japanese Patent Publication No. 5944826, the pad rubber is arranged on the outside in the tire radial direction further than the chafer layer, thus does not effectively contribute to suppression of the concentration of distortion at the rolled-up end of the chafer layer.

An object of the first aspect of the present invention is to provide a pneumatic tire including the chafer layer in the bead part which is capable of suppressing the concentration of distortion at the rolled-up end of the chafer layer.

The present invention provides a pneumatic tire including: a pair of bead cores; a pair of bead fillers that is connected to the pair of bead cores and extend to an outer-diameter-side in a tire radial direction; a carcass ply that is suspended between the pair of bead cores; a side wall rubber that is arranged on a tire-outer-surface-side of the carcass ply and constitutes a tire outer surface; a chafer layer that is turned from a tire-inner-surface-side to the tire-outer-surface-side around the bead cores and the bead fillers and rolled up on an outer surface of the carcass ply; and a pair of support rubbers that is located between the side wall rubber and the carcass ply and arranged such that a rolled-up end of the chafer layer is sandwiched from both sides in a tire width direction. The pair of support rubbers includes a tape rubber located inside in the tire width direction and a rear pad rubber located outside in the tire width direction, a modulus value of the tape rubber is higher than a modulus value of the side wall rubber, and a modulus value of the rear pad rubber is higher than the modulus value of the tape rubber.

According to the present invention, the rolled-up end of the chafer layer is sandwiched between the support rubbers having the modulus higher than that of the side wall rubber in the tire width direction, so that concentration of distortion likely to be generated near the rolled-up end is suppressed. As a result, separation at the rolled-up end of the chafer layer is suppressed.

Additionally, the rear pad rubber, which is located outside in the tire width direction in the pair of support rubbers and is easily subjected to input by load input from the rim flange and/or bending defamation of a tire side portion during tire rolling under a load, is configured to have the modulus higher than that of the tape rubber. Consequently, the tape rubber is prevented from having excessively high modulus while rigidity of the tire side portion is improved, so that adhesiveness of the tape rubber to the carcass ply and the chafer layer is easily secured. Thus, the separation at the rolled-up end of the chafer layer is further suppressed.

Preferably, the pneumatic tire further includes a rim strip rubber disposed inside in the tire radial direction of the side wall rubber. The modulus value of the rear pad rubber is lower than a modulus value of the rim strip rubber.

Preferably, the modulus value of the rear pad rubber is 0.85 times or more and 0.95 times or less of the modulus value of the rim strip rubber.

Preferably, the modulus value of the side wall rubber is 0.35 times or more and 0.75 times or less of the modulus value of the tape rubber.

Preferably, the modulus value of the tape rubber is 0.7 times or more and 0.9 times or less of the modulus value of the rear pad rubber.

According to this configuration, rigidity balance among the rear pad rubber, the tape rubber, the rim strip rubber, and the side wall rubber is suitably configured, and the steering stability and the ride comfort performance can be compatible with each other at a high level while the separation at the rolled-up end of the chafer layer is suppressed.

Preferably, the pad rubber is formed into a long trapezoidal shape in the tire radial direction such that the inner surface of the pad rubber, which comes in contact with outer surfaces of the chafer layer, the tape rubber and the carcass ply, is longer in the tire radial direction than the outer surface of the pad rubber which extends substantially parallel to the inner surface and comes in contact with an inner surface of the side wall rubber.

Preferably, the rear pad rubber is arranged in a radial range of 15% or more but not exceeding 45% of the tire reference cross-section height in the tire radial direction.

Preferably, the tape rubber is configured to have a substantially constant thickness of 1 mm or less.

Preferably, the tape rubber is arranged in a radial range of 5% or more but not exceeding 20% of a tire reference cross-section height in the tire radial direction.

Preferably, an inner-diameter-end of the tape rubber is located inside an inner-diameter-end of the rear pad rubber.

According to the present invention, in the pneumatic tire including the chafer layer in the bead part, it is possible to suppress the concentration of distortion at the rolled-up end of the chafer layer.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

An embodiment of the present invention will be described below in accordance with accompanying drawings. Incidentally, the following description is merely an example in essence, and is not intended to limit the invention and applications or uses of the invention. Furthermore, the drawings are schematically depicted, and the ratio of dimensions, etc. are different from actual ones.

Figure 1:
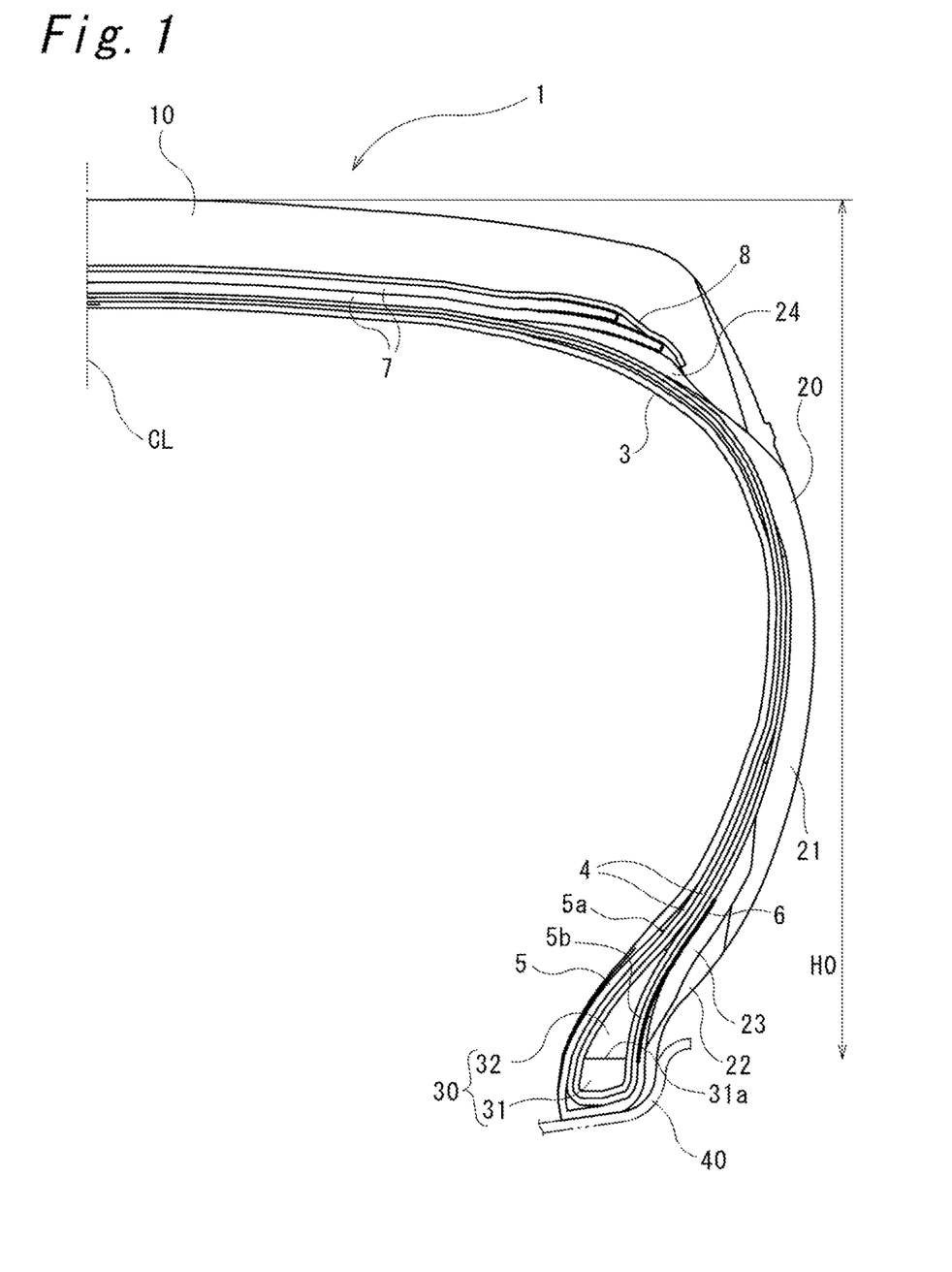
FIG. 1 is a meridional half sectional view of a pneumatic tire according to an embodiment of the present invention.

FIG. 1 is a meridional half sectional view of a pneumatic tire 1 according to the embodiment of the present invention, and illustrates only one side of the pneumatic tire 1 in a tire width direction along a tire equator line CL. The pneumatic tire 1 includes a tread part 10, a pair of side wall parts 20 that extend from ends of the tread part 10 in the tire width direction to the inside in a tire radial direction, and a pair of bead parts 30 that are located at respective inner ends of the pair of side wall parts 20 in the tire radial direction.

A carcass ply 4 is suspended between the pair of bead parts 30 over the tire-inner-surface-side of the tread part 10 and the side wall parts 20. In the present embodiment, the two-layered carcass ply 4 is provided. Between the tread part 10 and the carcass ply 4, a multi-layered belt layer 7 and a belt reinforcement layer 8 are wound in a tire circumferential direction in this order from the inside in the tire radial direction. An inner liner 3 is arranged on the tire-inner-surface-side of the carcass ply 4.

Figure 2:
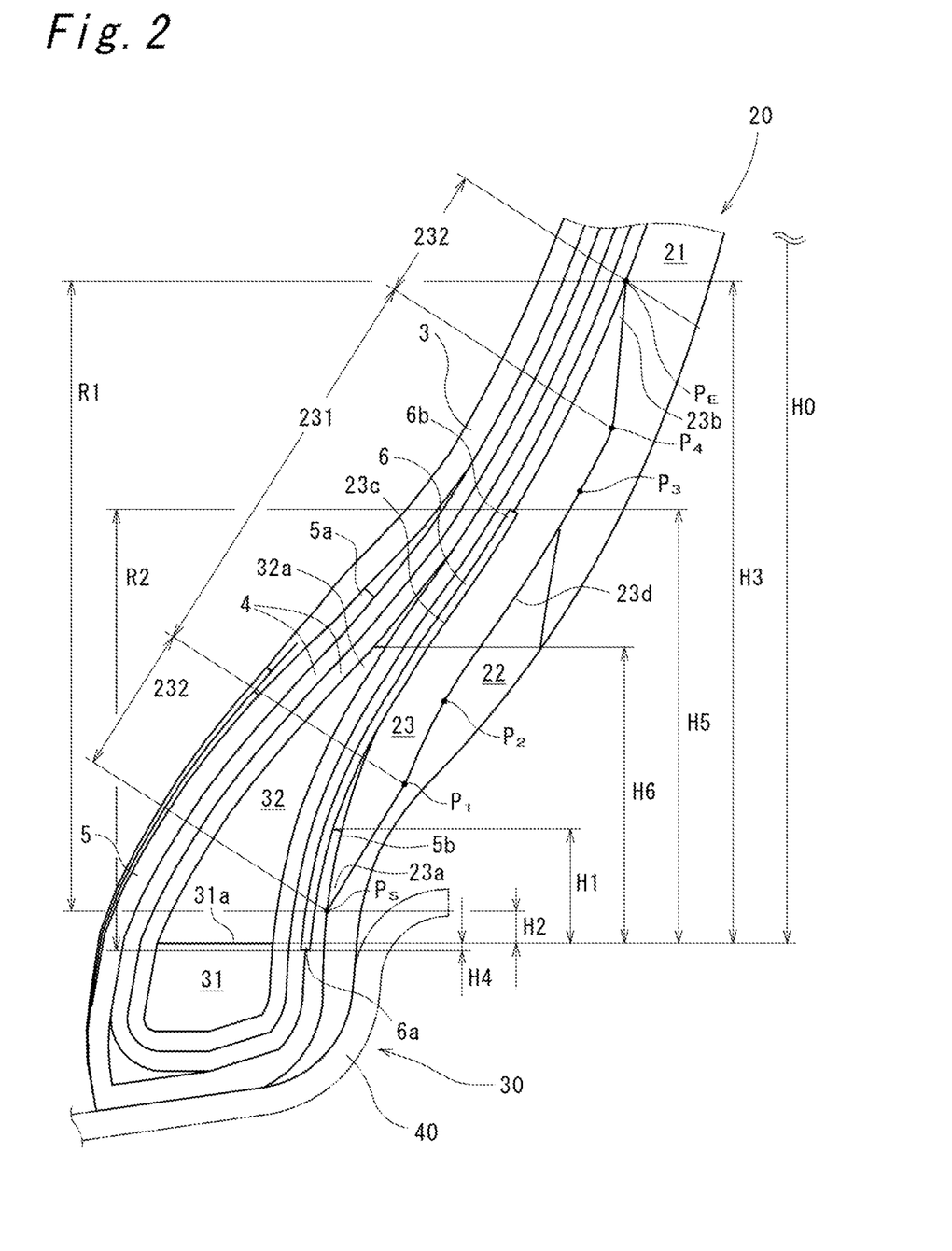
FIG. 2 is an enlarged view of around a bead part of the pneumatic tire shown in FIG. 1.

The bead part 30 includes a bead core 31 and a bead filler 32 that is connected to the bead core 31 and extends outward in the tire radial direction. The bead core 31 is a bundle of bead wires famed into an annular shape. The bead core 31 has an outer-diameter-side end surface 31a on its outer end surface in the tire radial direction. The bead filler 32 is a rubber material having a triangular cross-section formed into an annular shape along the outer-diameter-side end surface 31a of the bead core 31.

A chafer layer 5 is arranged around the bead part 30. The chafer layer 5 is arranged adjacent to the outer surface side (the side opposite to the bead part 30) of the carcass ply 4, and is turned from the inside to the outside in the tire width direction around the bead part 30 and rolled up to the outer-diameter-side in the tire radial direction together with the carcass ply 4. The chafer layer 5 is rubber-coated nylon or steel cords arranged side by side to a predetermined end number.

The chafer layer 5 has a rolled-in end 5a located on the inside in the tire width direction (the tire-inner-surface-side of the bead part 30) and a rolled-up end 5b located on the outside in the tire width direction (the tire-outer-surface-side of the bead part 30). A tape rubber 6 is arranged between the rolled-up end 5b of the chafer layer 5 and the carcass ply 4.

The tape rubber 6 is a tape-like thin-walled member, and is configured to have an approximately constant thickness of, for example, 1 mm or less.

The side wall part 20 includes a side wall rubber 21, a rim strip rubber 22, a rear pad rubber 23, and an under-belt pad rubber 24.

The side wall rubber 21 constitutes a main body of the side wall part 20. Furthermore, the side wall rubber 21 forms an outer surface of the pneumatic tire 1; rubber excellent in weather resistance, resistance to external damage, and resistance to rolling resistance is adopted as the side wall rubber 21. The rim strip rubber 22 is located on the inside of the side wall part 20 in the tire radial direction, and is a portion that comes in contact with a rim flange 40 when attached to a wheel.

The rear pad rubber 23 is located adjacent to the tire-inner-surface-side of the side wall rubber 21 and the rim strip rubber 22. The rear pad rubber 23 is located on the inner-surface-side of the side wall rubber 21 and is not exposed to the air; rubber that is less likely to be distorted and has excellent adhesiveness to the carcass ply 4 is adopted as the rear pad rubber 23. The under-belt pad rubber 24 is arranged to fill a gap between an end of the belt layer 7 in the tire width direction and the carcass ply 4.

The side wall part 20 is configured so that in the order of the under-belt pad rubber 24, the rim strip rubber 22, the rear pad rubber 23, and the side wall rubber 21, their 100% modulus value is lower. Respective 100% modulus values of the members 21 to 24 are configured, for example, so that the under-belt pad rubber 24 has a 100% modulus values of 4.0 MPa or more but not exceeding 5.5 MPa; the rim strip rubber 22 has a 100% modulus values of 4.0 MPa or more but not exceeding 4.5 MPa; the rear pad rubber 23 has a 100% modulus values of 3.5 MPa or more but not exceeding 3.9 MPa; the side wall rubber 21 has a 100% modulus values of 1.0 MPa or more but not exceeding 2.4 MPa. Incidentally, the 100% modulus value of each member is a value obtained by dividing a tensile strength when a test piece defined in JIS K6251:2010 3.7 is subjected to 100% elongation by the initial cross-section area of the test piece. Incidentally, a dumbbell specimen type 3 is used as the test piece.

The tape rubber 6 has a 100% modulus value of 2.5 MPa or more but not exceeding 3.4 MPa. That is, in the pair of support rubbers, the rear pad rubber 23 is configured to have a modulus higher than that of the tape rubber 6. Specifically, the 100% modulus value of the tape rubber 6 is 0.7 times or more and 0.9 times or less of the 100% modulus value of the rear pad rubber 23.

Similarly, the 100% modulus value of the rear pad rubber 23 is 0.85 times or more and 0.95 times or less of the 100% modulus value of the rim strip rubber 24. The 100% modulus value of the side wall rubber 21 is 0.35 times or more and 0.75 times or less of the 100% modulus value of the tape rubber 6.

Figure 3:
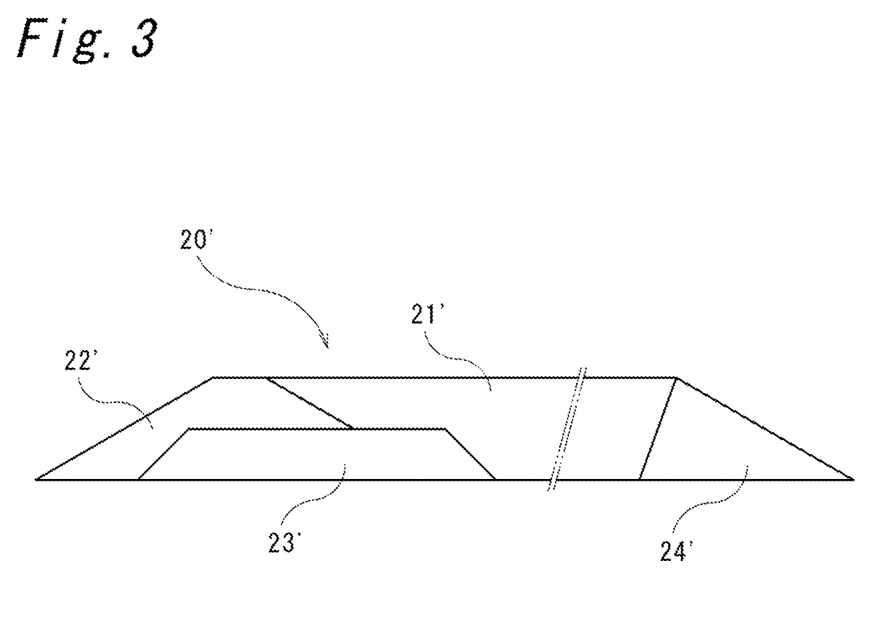
FIG. 3 is a diagram schematically showing a side wall member.

FIG. 3 schematically shows a side wall member 20' for forming the side wall part 20. The side wall part 20 is formed by winding the side wall member 20' into a cylindrical shape around a molding drum (not shown) and vulcanizing it within a tire vulcanizing mold (not shown).

In the present embodiment, for example, a side wall rubber member 21', a rim strip rubber member 22', a rear pad rubber member 23', and an under-belt pad rubber member 24' are each extruded from a nozzle and integrally formed into the side wall member 20'. These members 21' to 24' are vulcanized and famed into the side wall rubber 21, the rim strip rubber 22, the rear pad rubber 23, and the under-belt pad rubber 24, respectively.

Since these members 21' to 24' are integrally formed into the side wall member 20', the work to wind the side wall member 20' around the molding drum can be easily done as compared with a case where these members are individually constructed. Incidentally, these members 21' to 24' may be formed individually and each wound around the molding drum.

Subsequently, with reference to FIG. 2, respective positions of members located around the bead part 30 in the tire radial direction are described using the rate to a tire reference cross-section height H0 based on the outer-diameter-side end surface 31a of the bead core 31. In a case where the rate to the tire reference cross-section height H0 is a positive value, which means it is located on the outer-diameter-side in the tire radial direction further than the outer-diameter-side end surface 31a of the bead core 31; in a case where the rate is a negative value, which means it is located on the inner-diameter-side in the tire radial direction further than the outer-diameter-side end surface 31a.

Incidentally, as shown in FIG. 1, in this specification, the tire reference cross-section height H0 means a height from the outer-diameter-side end surface 31a of the bead core 31 to a highest point (a point of intersection with the tire equator line CL) of an outside surface of the tread part 10, provided that a sample cut out a predetermined range in the tire circumferential direction (for example, a range of 20 mm in the tire circumferential direction) from a pneumatic tire in the tire radial direction is measured in a state where the width between the pair of bead parts 30 is set to a standard rim width. The standard rim width here is a rim defined for each tire in a standards system including the standard on which the tire is based; for example, the "Standard Rim" is used in JATMA, the "Design Rim" is used in TRA, and the "Measuring Rim" is used in ETRTO.

In FIG. 2, a height position H1 of the rolled-up end 5b of the chafer layer 5 is located in a range of −3% or more but not exceeding 5% of the tire reference cross-section height H0 to the outer-diameter-side end surface 31a of the bead core 31.

A height position H2 of an inner-diameter-side end 23a of the rear pad rubber 23 in the tire radial direction is located on 5 mm or more the tire-inner-diameter-side further than the rolled-up end 5b of the chafer layer 5 and in a range of −5% or more but not exceeding 3% of the tire reference cross-section height H0 to the outer-diameter-side end surface 31a of the bead core 31. Furthermore, a height position H3 of an outer-diameter-side end 23b of the rear pad rubber 23 in the tire radial direction is located in a range of 16% or more but not exceeding 45% of the tire reference cross-section height H0 to the outer-diameter-side end surface 31a of the bead core 31. Incidentally, the rear pad rubber 23 is arranged in a height range R1 of 15% or more but not exceeding 45% of the tire reference cross-section height H0.

A height position H4 of an inner-diameter-side end 6a of the tape rubber 6 in the tire radial direction is located on the tire-inner-diameter-side further than the inner-diameter-side end 23a of the rear pad rubber 23 and in a range of −6% or more but not exceeding 2% of the tire reference cross-section height H0 to the outer-diameter-side end surface 31a of the bead core 31; a height position H5 of an outer-diameter-side end 6b is located in a range of 10% or more but not exceeding 15% of the tire reference cross-section height H0 to the outer-diameter-side end surface 31a of the bead core 31. Incidentally, the tape rubber 6 is arranged in a height range R2 of 5% or more but not exceeding 20% of the tire reference cross-section height H0.

Furthermore, a height position H6 of an outer-diameter-side end 32a of the bead filler 32 is located on the inside in the tire radial direction further than the outer-diameter-side end 23b of the rear pad rubber 23 and in a range of 8% or more but not exceeding 40% of the tire reference cross-section height H0 to the outer-diameter-side end surface 31a of the bead core 31.

That is, the rolled-up end 5b of the chafer layer 5 is supported in the tire width direction by a pair of support rubbers composed of the tape rubber 6 and the rear pad rubber 23 that are arranged adjacent to the rolled-up end 5b in the tire width direction.

Subsequently, the rear pad rubber 23 is described in detail.

The rear pad rubber 23 is famed into a trapezoid that the inner surface 23c ($P_S$ to $P_E$ in FIG. 2), which comes in contact with outer surfaces of the chafer layer 5, the tape rubber 6, and the carcass ply 4, is long in the tire radial direction as compared with an outer surface 23d ($P_1$ to $P_4$ in FIG. 2), which extends approximately parallel to the inner surface 23c and comes in contact with inner surfaces of the side wall rubber 21 and the rim strip rubber 22. The rear pad rubber 23 has a constant thickness portion 231 and a pair of tapered thickness portions 232. The constant thickness portion 231 has an approximately constant thickness at a portion corresponding to the outer surface 23d. The pair of tapered thickness portions 232 have a thickness that gradually decreases from either end of the constant thickness portion 231 in the tire radial direction toward the tire radial direction.

In FIG. 2, a portion indicated by $P_S$ to $P_1$ is the tapered thickness portion 232 located on the inner-diameter-side in the tire radial direction; a portion located in $P_1$ to $P_4$ is the constant thickness portion 231; a portion indicated by $P_4$ to $P_E$ is the tapered thickness portion 232 located on the outer-diameter-side in the tire radial direction. That is, inflection points $P_1$ and $P_4$ at which a transition to the tapered thickness portion 232 is made exist in either end of the tire-outer-surface-side of the constant thickness portion 231 in the tire radial direction.

The constant thickness portion 231 is located on the outside in the tire radial direction further than the rolled-up end 5b of the chafer layer 5; that is, the tapered thickness portion 232 located on the inside in the tire radial direction is located adjacent to the rolled-up end 5b of the chafer layer 5.

Figure 4:
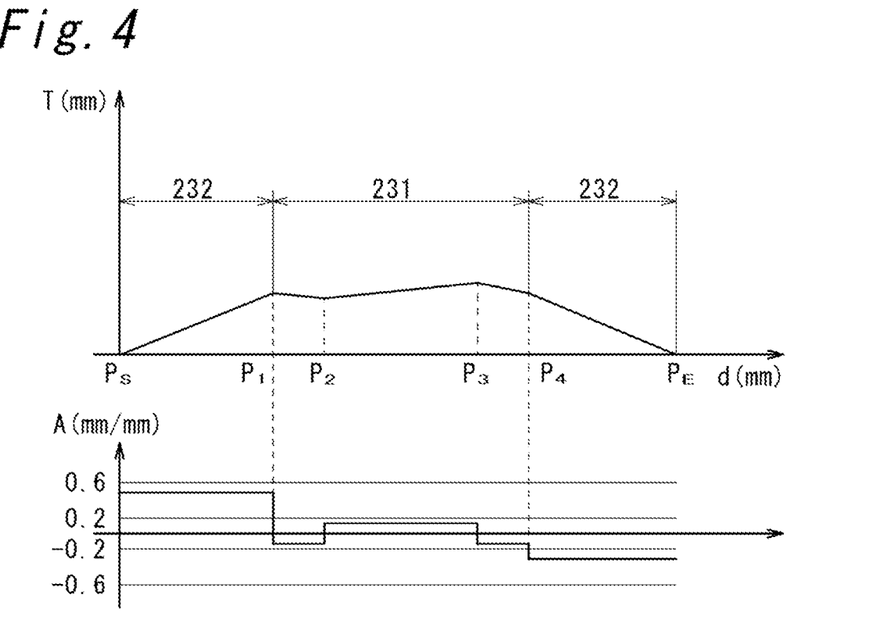
FIG. 4 is a graph showing a thickness of a pad rubber.

FIG. 4 is a graph showing a thickness T (mm) of the rear pad rubber 23. The thickness T of the rear pad rubber 23 is shown as a thickness in a direction perpendicular to the surface of the carcass ply 4. The graph shows the thickness T in each position at a distance d (mm) along the outer surface of the carcass ply 4 from one end of the rear pad rubber 23 in the tire radial direction toward the other end (in the present embodiment, from the inner-diameter-side end 23a ($P_S$) toward the outer-diameter-side end 23b ($P_E$)); that is, the thickness T is shown as a thickness function T(d) that is a function of the distance d. Furthermore, a slope A of the function T(d) is also shown.

As shown in FIG. 4, the constant thickness portion 231 means a portion having the slope A of the function T(d) of which the absolute value is 0.2 mm/mm or less; the tapered thickness portion 232 means a portion having the slope A of the function T(d) of which the absolute value is greater than 0.2 mm/mm. That is, according to the function T(d), the thickness of the inner-diameter-side tapered thickness portion 232 increases from $P_S$ toward $P_1$. The thickness of the constant thickness portion 231 is approximately constant from $P_1$ to $P_4$; however, specifically, the thickness slightly decreases from $P_1$ to $P_2$, and slightly increases from $P_2$ to $P_3$, and then slightly decreases from $P_3$ to $P_4$. Furthermore, the thickness of the outer-diameter-side tapered thickness portion 232 decreases from $P_4$ to $P_E$.

The constant thickness portion 231 is set to a height range of 7% or more but not exceeding 26% of the tire reference cross-section height H0. Furthermore, the tapered thickness portion 232 is preferably set to have the slope of the function T(d) of which the absolute value is 0.6 mm/mm or less, which makes it easy to secure the contact area of the tapered thickness portion 232 with the side wall rubber 21.

The pneumatic tire 1 described above achieves the following effects.

(1) The rolled-up end 5*b* of the chafer layer 5 is held in the tire width direction by the tape rubber 6 and the rear pad rubber 23 that have a higher modulus than the side wall rubber 21, and therefore, distortion likely to be generated near the rolled-up end 5*b* is suppressed. As a result, separation at the rolled-up end 5*b* of the chafer layer 5 is suppressed.

Additionally, the rear pad rubber 23, which is located outside in the tire width direction in the pair of support rubbers and is easily subjected to input by load input from the rim flange and/or bending deformation of a tire side portion during tire rolling under a load, is configured to have the modulus higher than that of the tape rubber 6. Consequently, the tape rubber 6 is prevented from having the excessively high modulus while rigidity of the tire side portion is improved, so that adhesiveness of the tape rubber 6 to the carcass ply 4 and the chafer layer 5 is easily secured. Thus, the separation at the rolled-up end 5*b* of the chafer layer 5 is further suppressed.

(2) The rear pad rubber 23 has a modulus lower than that of the rim strip rubber 22. Specifically, with respect to the 100% modulus value, the rear pad rubber 23 has a 100% modulus value that is 0.85 times or more and 0.95 times or less of that of the rim strip rubber 22, the side wall rubber 21 has a 100% modulus value that is 0.35 times or more and 0.7 times or less of that of the tape rubber 6, the tape rubber 6 has a 100% modulus value that is 0.7 times or more and 0.9 times or less of that of the rear pad rubber. Consequently, the rigidity balance among the rear pad 23, the tape rubber 6, the rim strip rubber 22, and the side wall rubber 21 is suitably configured, and the steering stability and the ride comfort performance can be compatible with each other at a high level while the separation at the rolled-up end 5*b* of the chafer layer 5 is suppressed.

(3) The tape rubber 6 is arranged between the rolled-up end 5*b* of the chafer layer 5 and the carcass ply 4, and therefore, a level difference famed on the outer surface of the carcass ply 4 can be reduced by the tape rubber 6. As a result, the rolled-up end 5*b* of the chafer layer 5 is easily rolled up along the outer surface of the carcass ply 4. Accordingly, while the rolled-up end 5*b* of the chafer layer 5 is held in the tire width direction by the tape rubber 6 and the rear pad rubber 23, an excessive level difference is not famed near the rolled-up end 5*b* of the chafer layer 5, and therefore, bareness caused by the level difference is easily suppressed. As a result, separation at the rolled-up end 5*b* of the chafer layer 5 can be further suppressed.

In contrast, in a case where the rear pad rubber 23 is arranged between the rolled-up end 5*b* of the chafer layer 5 and the carcass ply 4, a larger level difference is formed on the outer surface of the carcass ply 4 due to the rear pad rubber 23, and the larger level difference is likely to cause bareness between the outer surface of the carcass ply 4 and a member arranged on top of the level difference.

(4) The positions of respective ends of the rear pad rubber 23 and the tape rubber 6 in the tire radial direction where distortion is likely to be concentrate are different in the tire radial direction; therefore, it is possible to suppress the excessive concentration of distortion on the radial-direction ends.

(5) The height position H1 of the rolled-up end 5*b* of the chafer layer 5 is located in a range of −3% or more but not exceeding 5% of the tire reference cross-section height H0 with reference to the outer-diameter-side end surface 31*a* of the bead core 31. Accordingly, it is possible to prevent the rolled-up end 5*b* of the chafer layer 5 from being located excessively on the outer-diameter-side in the tire radial direction while the chafer layer 5 is arranged to correspond to a contact portion of the bead part 30 of the pneumatic tire 1 with the rim flange 40. Accordingly, even in a case where a contact portion of the rim strip rubber 22 with the rim flange 40 is worn, exposure of the carcass ply 4 can be suppressed by the chafer layer 5.

Furthermore, by imposing a limitation on the height position of the rolled-up end 5*b* of the chafer layer 5 in the tire radial direction, the rolled-up end 5*b* is easily arranged to be kept away from a portion of the side wall part 20 where distortion is large, and an increase in distortion caused by deformation of the side wall part 20 is suppressed. As a result, separation at the rolled-up end 5*b* of the chafer layer 5 can be further suppressed.

Incidentally, if the rolled-up end 5*b* of the chafer layer 5 is located on the 3% or more inner-diameter-side of the tire reference cross-section height to the inside in the tire radial direction with reference to the outer-diameter-side end surface 31*a* of the bead core 31, the carcass ply 4 may be exposed when the bead part 30 is worn. Furthermore, if the rolled-up end 5*b* of the chafer layer 5 is located on the 5% or more outer-diameter-side of the tire reference cross-section height to the outside in the tire radial direction with reference to the outer-diameter-side end surface 31*a* of the bead core 31, the rolled-up end 5*b* comes close to a portion of the side wall part 20 where distortion is large, and therefore distortion is likely to increase excessively.

(6) The rolled-up end 5*b* of the chafer layer 5 is securely supported by the tape rubber 6 and the rear pad rubber 23 over a length of at least 5 mm or more in the tire radial direction, and therefore, the concentration of distortion is suitably suppressed.

(7) The rear pad rubber 23 is arranged in the height range R1 of 15% or more but not exceeding 45% of the tire reference cross-section height H0, and therefore is located over a predetermined range in the tire radial direction while being located to have an overlap with the rolled-up end 5*b* of the chafer layer 5. Accordingly, distortion generated around the bead part 30 of the pneumatic tire 1 can be dispersed over the predetermined range in the tire radial direction through the rear pad rubber 23; therefore, it is possible to suppress distortion of the rolled-up end 5*b* of the chafer layer 5. Incidentally, if the rear pad rubber 23 is arranged in a radial range larger than 45% of the tire reference cross-section height H0, the proportion of the side wall rubber 21 in the side wall part 20 is excessively decreased, which deteriorates the fuel efficiency.

Furthermore, the height position H6 of the outer-diameter-side end 32*a* of the bead filler 32 is located on the inside in the tire radial direction further than the outer-diameter-side end 23*b* of the rear pad rubber 23. Accordingly, distortion likely to be generated near the outer-diameter-side end 32*a* of the bead filler 32 is suppressed by the rear pad rubber 23. Therefore, around the bead part 30, separation at not only the rolled-up end 5b of the chafer layer 5 but also near the outer-diameter-side end 32a of the bead filler 32 is suitably suppressed.

(8) The tape rubber 6 is arranged in the height range R2 of 5% or more but not exceeding 20% of the tire reference cross-section height H0, and therefore is located over a predetermined range in the tire radial direction while being located to have an overlap with the rolled-up end 5b of the chafer layer 5. Accordingly, distortion generated around the bead part 30 of the pneumatic tire 1 can be dispersed over the predetermined range in the tire radial direction through the tape rubber 6, and therefore, distortion of the rolled-up end 5b of the chafer layer 5 is suppressed.

(9) The rear pad rubber 23 has the constant thickness portion 231 over a height range of 7% or more but not exceeding 26% of the tire reference cross-section height H0, and therefore, distortion generated around the bead part 30 of the pneumatic tire 1 can be dispersed over a predetermined range in the tire radial direction through the rear pad rubber 23. Accordingly, distortion of the rolled-up end 5b of the chafer layer 5 is further reduced.

If the height range of the constant thickness portion 231 is smaller than 7% of the tire reference cross-section height H0, the distortion dispersion effect of the constant thickness portion 231 is reduced. If the height range of the constant thickness portion 231 is larger than 26% of the tire reference cross-section height H0, the proportion of the rear pad rubber 23 in the side wall part 20 is excessively increased, and the proportion of the side wall rubber 21 is excessively decreased, which diminishes the enhancing effect in the rolling-resistance performance due to the side wall rubber 21, and therefore, the fuel efficiency is likely to deteriorate.

(10) The constant thickness portion 231 is a portion of the rear pad rubber 23 having the slope A of the thickness function T(d) of which the absolute value is 0.2 mm/mm or less. Accordingly, the constant thickness portion 231 has too small variations in thickness to disperse a distortion generated around the bead part 30 widely in the tire radial direction.

(11) The constant thickness portion 231 of the rear pad rubber 23 is not located at the rolled-up end 5b of the chafer layer 5, and therefore, the volume of the rim strip rubber 22 arranged on the tire-outer-surface-side of the rolled-up end 5b of the chafer layer 5 is easily secured.

(12) The tapered thickness portion 232 is a portion of the rear pad rubber 23 having the slope A of the thickness function T(d) of which the absolute value is greater than 0.2 mm/mm but not exceeding 0.6 mm/mm. Accordingly, it is possible to suppress separation at the tapered thickness portion 232 while preventing the tapered thickness portion 232 from being excessively long.

That is, if the absolute value of the slope A of the tapered thickness portion 232 is 0.2 mm/mm or less, the tapered thickness portion 232 becomes long, and the proportion of the side wall rubber 21 in the side wall part 20 is excessively decreased, which diminishes the enhancing effect in the rolling-resistance performance due to the side wall rubber 21, and therefore, the fuel efficiency is likely to deteriorate. Furthermore, if the absolute value of the slope A of the tapered thickness portion 232 is greater than 0.6 mm/mm, the tapered thickness portion 232 becomes short, and the contact area of the tapered thickness portion 232 with the side wall rubber 21 is reduced, and as a result, the adhesiveness of the tapered thickness portion 232 of the rear pad rubber 23 is likely to be reduced, and the separation-resistance performance is likely to deteriorate.

Examples 1 to 3

Evaluation tests of durability, steering stability, and ride comfort performance were performed on pneumatic tires of Comparative Examples 1, 2 and Examples 1 to 3 in Table 1 shown below. Each pneumatic tire has a tire size of 235/65R16, and includes the side wall rubber 21, the rim strip rubber 22, the rear pad rubber 23, and the tape rubber 6, which are arranged in a predetermined positional relationship as described in the embodiment. The pneumatic tires having tire size of 235/65R16 differ from each other only in the 100% modulus value M100p of the rear pad rubber 23. The specifications not particularly described below are common to each pneumatic tire.

TABLE 1

|  |  | Comparative Example 1 | Comparative Example 2 | Example 1 | Example 2 | Example 3 |
|---|---|---|---|---|---|---|
|  | Rim strip rubber M100r (MPa) | 4.1 | 4.1 | 4.1 | 4.1 | 4.1 |
|  | Rear pad rubber M100p (MPa) | 3.4 | 4.0 | 3.5 | 3.7 | 3.9 |
|  | Tape rubber M100t (MPa) | 3.0 | 3.0 | 3.0 | 3.0 | 3.0 |
|  | Side wall rubber M100sw (MPa) | 1.7 | 1.7 | 1.7 | 1.7 | 1.7 |
|  | M100p/M100r | 0.83 | 0.98 | 0.85 | 0.90 | 0.95 |
| Performance | Durability | 100 | 101 | 101 | 102 | 103 |
|  | Steering stability | 100 | 105 | 101 | 103 | 105 |
|  | Ride comfort performance | 100 | 98 | 103 | 102 | 100 |

As shown in Table 1, in Comparative Example 1, the 100% modulus value M100p of the rear pad rubber 23 is 3.4 MPa, which is smaller the lower limit of the range (3.5 MPa or more but not exceeding 3.9 MPa) of the 100% modulus value M100p of the rear pad rubber 23 in the embodiment. The ratio (M100p/M100r) to the 100% modulus value M100r of the rim strip rubber 22 is 0.83, which is smaller than the lower limit of the range (0.85 or more but not exceeding 0.95) in the above embodiment.

In Comparative Example 2, the 100% modulus value M100p of the rear pad rubber 23 is 4.0 MPa, which is larger than the upper limit of the range (3.5 MPa or more but not exceeding 3.9 MPa) of the 100% modulus value M100p of the rear pad rubber 23 in the embodiment. The ratio (M100p/M100r) to the 100% modulus value M100r of the rim strip rubber 22 is 0.98, which is larger than the upper limit of the range (0.85 or more but not exceeding 0.95) in the embodiment.

In Example 1, the 100% modulus value M100p of the rear pad rubber 23 is 3.5 MPa, which is the lower limit of the range (3.5 MPa or more but not exceeding 3.9 MPa) of the 100% modulus value M100p of the rear pad rubber 23 in the embodiment. The ratio (M100p/M100r) to the 100% modulus value M100r of the rim strip rubber 22 is 0.85, which is the lower limit of the range (0.85 or more but not exceeding 0.95) in the embodiment.

In Example 2, the 100% modulus value M100p of the rear pad rubber 23 is 3.7 MPa, which is the substantial median of the range (3.5 MPa or more but not exceeding 3.9 MPa) of the 100% modulus value M100p of the rear pad rubber 23 in the embodiment. The ratio (M100p/M100r) to the 100% modulus value M100r of the rim strip rubber 22 is 0.90, which is the median of the range (0.85 or more but not exceeding 0.95) in the embodiment.

In Example 3, the 100% modulus value M100p of the rear pad rubber 23 is 3.9 MPa, which is the upper limit of the range (3.5 MPa or more but not exceeding 3.9 MPa) of the 100% modulus value M100p of the rear pad rubber 23 in the embodiment. The ratio (M100p/M100r) to the 100% modulus value M100r of the rim strip rubber 22 is 0.95, which is the upper limit of the range (0.85 or more but not exceeding 0.95) in the embodiment.

In the evaluation of the durability, each pneumatic tire was mounted on a specified rim, charged with a specified air pressure, a predetermined load was applied to each pneumatic tire, a vehicle was driven at a speed of 80 km/h, the load was gradually increased, and a running time was evaluated until the tire was out of service.

In the evaluation of the steering stability, each pneumatic tire was mounted on a vehicle, running was performed by acceleration, braking, turning, and a lane change on a dry road surface paved with asphalt. The evaluation of the steering stability was performed by sensory evaluation of a test driver.

In the evaluation of the ride comfort performance, each pneumatic tire was mounted on a vehicle, and two people got on the vehicle while the air pressure was set to the air pressure designated by the vehicle. The evaluation of the ride comfort performance was performed by sensory evaluation of test drivers in an evaluation course having relatively large protrusions and small irregularities such as a joint of a bridge paved with asphalt or concrete.

In each evaluation, Comparative Example 2 and Examples 1 to 3 are indicated by indices with Comparative Example 1 as 100. A larger value indicates that each performance is superior.

In each of Examples 1 to 3, the durability, the steering stability, and the ride comfort performance are larger than 100, and are improved as compared to Comparative Example 1. The rigidity of the tire side portion is improved with increasing ratio M100p/M100r (that is, with increasing 100% modulus value M100p of the rear pad rubber 23), so that a degree of improvement of the ride comfort performance is decreased while the durability and the steering stability are improved.

In each of Examples 1 to 3, M100p/M100r is larger than that of Comparative Example 1 and the rigidity of the tire side portion is increased. However, since the balance of rigidity becomes appropriate, the ride comfort performance is improved as compared to Comparative Example 1. On the other hand, as in Comparative Example 2, when M100p/M100r is larger than the range in the embodiment, the ride comfort performance is degraded because the rigidity of the tire side portion is excessively increased.

Examples 4 to 6

Evaluation tests were also performed on pneumatic tires of Comparative Examples 3, 4 and Examples 4 to 6 in Table 2 shown below for the durability, the steering stability, and the ride comfort performance. Each pneumatic tire has a tire size of 235/65R16, and includes the side wall rubber 21, the rim strip rubber 22, the rear pad rubber 23, and the tape rubber 6, which are arranged in a predetermined positional relationship as described in the embodiment. The pneumatic tire having the tire size of 235/65R16 differ from each other only in the 100% modulus value M100t of the tape rubber 6. The specifications not particularly described below are common to each pneumatic tire.

TABLE 2

|  |  | Comparative Example 3 | Comparative Example 4 | Example 4 | Example 5 | Example 6 |
|---|---|---|---|---|---|---|
| Rim strip rubber M100r (MPa) |  | 4.1 | 4.1 | 4.1 | 4.1 | 4.1 |
| Rear pad rubber M100p (MPa) |  | 3.7 | 3.7 | 3.7 | 3.7 | 3.7 |
| Tape rubber M100t (MPa) |  | 2.4 | 3.5 | 2.6 | 3.0 | 3.3 |
| Side wall rubber M100sw (MPa) |  | 1.7 | 1.7 | 1.7 | 1.7 | 1.7 |
| M100t/M100p |  | 0.65 | 0.95 | 0.70 | 0.81 | 0.89 |
| Performance | Durability | 100 | 103 | 101 | 102 | 103 |
|  | Steering stability | 100 | 100 | 100 | 102 | 103 |
|  | Ride comfort performance | 100 | 98 | 103 | 102 | 101 |

As shown in Table 2, in Comparative Example 3, the 100% modulus value M100t of the tape rubber 6 is 2.4 MPa, which is smaller than the lower limit value of the range (2.5 MPa or more but not exceeding 3.4 MPa) of the 100% modulus value M100t of the tape rubber 6 in the embodiment. The ratio (M100t/M100p) to the 100% modulus value M100p of the rear pad rubber 23 is 0.65, which is smaller than the lower limit of the range (0.70 or more but not exceeding 0.90) in the embodiment.

In Comparative Example 4, the 100% modulus value M100t of the tape rubber 6 is 3.5 MPa, which is larger than the upper limit of the range (2.5 MPa or more but not exceeding 3.4 MPa) of the 100% modulus value M100t of the tape rubber 6 in the embodiment. The ratio (M100t/M100p) to the 100% modulus value M100p of the rear pad rubber 23 is 0.95, which is larger than the upper limit of the range (0.70 or more but not exceeding 0.90) in the embodiment.

In Example 4, the 100% modulus value M100t of the tape rubber 6 is 2.6 MPa, which is the substantially lower limit of the range (2.5 MPa or more but not exceeding 3.4 MPa) of the 100% modulus value M100t of the tape rubber 6 in the embodiment. The ratio (M100t/M100p) to the 100% modulus value M100p of the rear pad rubber 23 is 0.70, which is the lower limit of the range (0.70 or more but not exceeding 0.90) in the embodiment.

In Example 5, the 100% modulus value M100t of the tape rubber 6 is 3.0 MPa, which is the substantial median of the range (2.5 MPa or more but not exceeding 3.4 MPa) of the 100% modulus value M100t of the tape rubber 6 in the embodiment. The ratio (M100t/M100p) to the 100% modulus value M100p of the rear pad rubber 23 is 0.81, which is the substantial median of the range (0.70 or more but not exceeding 0.90) in the embodiment.

In Example 6, the 100% modulus value M100t of the tape rubber 6 is 3.3 MPa, which is the substantially upper limit value of the range (2.5 MPa or more but not exceeding 3.4 MPa) of the 100% modulus value M100t of the tape rubber 6 in the embodiment. The ratio (M100t/M100p) to the 100% modulus value M100p of the rear pad rubber 23 is 0.89, which is the approximately upper limit value of the range (0.70 or more but not exceeding 0.90) in the embodiment.

In each of the evaluations of the durability, the steering stability, and the ride comfort performance, Comparative Example 4 and Examples 4 to 6 are indicated by indices with Comparative Example 3 as 100. A larger value indicates that each performance is superior.

In each of Examples 4 to 6, the durability, the steering stability, and the ride comfort performance are larger than 100, and are improved as compared to Comparative Example 3. The rigidity of the tire side portion is improved with increasing ratio M100t/M100p (that is, with increasing 100% modulus value M100t of the tape rubber 6), so that the degree of improvement of the ride comfort performance is decreased while the durability and the steering stability are improved.

In each of Examples 4 to 6, M100t/M100p is larger than that of Comparative Example 3, and the rigidity of the tire side portion is increased. However, since the balance of rigidity becomes appropriate, the ride comfort performance is improved as compared to Comparative Example 3. On the other hand, as in Comparative Example 4, when M100t/M100p is larger than the range in the embodiment, the ride comfort performance is degraded because the rigidity of the tire side portion is excessively increased.

Examples 7 to 9

Evaluation tests were also performed on pneumatic tires of Comparative Examples 5, 6 and Examples 7 to 9 in Table 3 shown below for the durability, the steering stability, and the ride comfort performance. Each pneumatic tire has a tire size of 235/65R16, and includes the side wall rubber 21, the rim strip rubber 22, the rear pad rubber 23, and the tape rubber 6, which are arranged in a predetermined positional relationship as described in the embodiment. The pneumatic tire having the tire size of 235/65R16 differ from each other only in the 100% modulus value M100sw of the side wall rubber 21. The specifications not particularly described below are common to each pneumatic tire.

TABLE 3

|  |  | Comparative Example 5 | Comparative Example 6 | Example 7 | Example 8 | Example 9 |
|---|---|---|---|---|---|---|
| Rim strip rubber M100r (MPa) | | 4.1 | 4.1 | 4.1 | 4.1 | 4.1 |
| Rear pad rubber M100p (MPa) | | 3.7 | 3.7 | 3.7 | 3.7 | 3.7 |
| Tape rubber M100t (MPa) | | 3.0 | 3.0 | 3.0 | 3.0 | 3.0 |
| Side wall rubber M100sw (MPa) | | 0.9 | 2.5 | 1.1 | 1.7 | 2.2 |
| M100sw/M100t | | 0.30 | 0.83 | 0.37 | 0.57 | 0.73 |
| Performance | Durability | 100 | 98 | 103 | 102 | 100 |
| | Steering stability | 100 | 106 | 101 | 103 | 105 |
| | Ride comfort performance | 100 | 98 | 102 | 101 | 100 |

As shown in Table 3, in Comparative Example 5, the 100% modulus value M100sw of the side wall rubber 21 is 0.9 MPa, which is smaller than the lower limit of the range (1.0 MPa or more but not exceeding 2.4 MPa) of the 100% modulus value M100sw of the side wall rubber 21 in the embodiment. The ratio (M100sw/M100t) to the 100% modulus value M100t of the tape rubber 6 is 0.30, which is smaller than the lower limit of the range (0.35 or more but not exceeding 0.75) in the embodiment.

In Comparative Example 6, the 100% modulus value M100sw of the side wall rubber 21 is 2.5 MPa, which is larger than the upper limit of the range (1.1 MPa or more but not exceeding 2.4 MPa) of the 100% modulus value M100sw of the side wall rubber 21 in the embodiment. The ratio (M100sw/M100t) to the 100% modulus value M100t of the tape rubber 6 is 0.83, which is larger than the upper limit of the range (0.35 or more but not exceeding 0.75) in the embodiment.

In Example 7, the 100% modulus value M100sw of the side wall rubber 21 is 1.1 MPa, which is the lower limit of the range (1.1 MPa or more but not exceeding 2.4 MPa) of M100sw of the side wall rubber 21 in the embodiment. The ratio (M100sw/M100t) to the 100% modulus value M100t of the tape rubber 6 is 0.37, which is the substantially lower limit of the range (0.35 or more but not exceeding 0.75) in the embodiment.

In Example 8, the 100% modulus value M100sw of the side wall rubber 21 is 1.7 MPa, which is the substantial median of the range (1.1 MPa or more but not exceeding 2.4 MPa) of the 100% modulus value M100sw of the side wall rubber 21 in the embodiment. The ratio (M100sw/M100t) to the 100% modulus value M100t of the tape rubber 6 is 0.57, which is the substantial median of the range (0.35 or more but not exceeding 0.75) in the embodiment.

In Example 9, the 100% modulus value M100sw of the side wall rubber 21 is 2.2 MPa, which is the substantially upper limit value of the range (1.1 MPa or more but not exceeding 2.4 MPa) of the 100% modulus value M100sw of the side wall rubber 21 in the embodiment. The ratio (M100sw/M100t) to the 100% modulus value M100t of the tape rubber 6 is 0.73, which is a substantially upper limit value of the range (0.35 or more but not exceeding 0.75) in the embodiment.

In the evaluations of the durability, the steering stability, and the ride comfort performance, Comparative Example 6 and Examples 7 to 9 are indicated by indices with Comparative Example 5 as 100. A larger value indicates that each performance is superior.

In each of Examples 7 to 9, the durability, the steering stability, and the ride comfort performance are larger than 100, and are improved as compared to Comparative Example 5. The rigidity of the tire side portion is improved with increasing ratio M100sw/M100t (that is, with increasing 100% modulus value M100sw of the side wall rubber 21), so that the degree of improvement of the ride comfort performance is decreased while the durability and the steering stability are improved.

In each of Examples 7 to 9, M100sw/M100t is larger than that of Comparative Example 5, and the rigidity of the tire side portion is increased. However, since the balance of rigidity becomes appropriate, the ride comfort performance is improved as compared to Comparative Example 5. On the other hand, as in Comparative Example 6, when M100sw/M100t is larger than the range in the embodiment, the ride comfort performance is degraded because the rigidity of the tire side portion is excessively increased.

What is claimed is:

1. A pneumatic tire comprising:
   a tread part;
   a pair of side wall parts that extend radially inwardly from widthwise ends the tread part;
   a pair of bead parts located at respective radially inner ends of the pair of side wall parts, each bead part comprising a bead core and a bead filler that is connected to the bead core and extends to an outer-diameter-side in a tire radial direction;
   a carcass ply that is suspended between the bead cores;

a side wall rubber in each side wall part that is arranged on a tire-outer-surface-side of the carcass ply and constitutes a tire outer surface;

a chafer layer in each side wall part that is arranged adjacent to the outer surface side of the carcass ply and is turned from a tire-inner-surface-side to the tire-outer-surface-side around the bead core and the bead filler and rolled up to the outer-diameter-side in the tire radial direction together with the carcass ply; and a pair of support rubbers in each side wall part that are located between the side wall rubber and the carcass ply and arranged such that a tire-outer-surface-side rolled-up end of the chafer layer is sandwiched from both sides in a tire width direction, wherein the pair of support rubbers in each side wall part includes a tape rubber located inside in the tire width direction and a rear pad rubber located outside in the tire width direction, the 100% modulus value of the tape rubber is higher than the 100% modulus value of the side wall rubber, and the 100% modulus value of the rear pad rubber is higher than the 100% modulus value of the tape rubber.

2. The pneumatic tire according to claim 1, further comprising a rim strip rubber disposed inside in the tire radial direction of each side wall rubber, wherein the 100% modulus value of the rear pad rubber is lower than the 100% modulus value of the rim strip rubber.

3. The pneumatic tire according to claim 2, wherein the 100% modulus value of the rear pad rubber is 0.85 times or more and 0.95 times or less of the 100% modulus value of the rim strip rubber.

4. The pneumatic tire according to claim 1, wherein the 100% modulus value of the side wall rubber is 0.35 times or more and 0.75 times or less of the 100% modulus value of the tape rubber.

5. The pneumatic tire according to claim 1, wherein the 100% modulus value of the tape rubber is 0.7 times or more and 0.9 times or less of the 100% modulus value of the rear pad rubber.

6. The pneumatic tire according to claim 1, wherein the pad rubber is formed into a long trapezoidal shape in the tire radial direction such that an inner surface of the pad rubber, which comes in contact with outer surfaces of the chafer layer, the tape rubber and the carcass ply, is longer in the tire radial direction than an outer surface of the pad rubber which extends substantially parallel to the inner surface and comes in contact with an inner surface of the side wall rubber.

7. The pneumatic tire according to claim 1, wherein the rear pad rubber is arranged in a radial range of 15% or more but not exceeding 45% of a tire reference cross-section height in the tire radial direction.

8. The pneumatic tire according to claim 1, wherein the tape rubber is configured to have a constant thickness of 1 mm or less.

9. The pneumatic tire according to claim 1, wherein the tape rubber is arranged in a radial range of 5% or more but not exceeding 20% of a tire reference cross-section height in the tire radial direction.

10. The pneumatic tire according to claim 1, wherein an inner-diameter-end of the tape rubber is located inside an inner-diameter-end of the rear pad rubber.

* * * * *